United States Patent
Latheef et al.

(10) Patent No.: US 11,483,749 B2
(45) Date of Patent: Oct. 25, 2022

(54) METHOD AND UE FOR HANDLING CELL SELECTION IN WIRELESS COMMUNICATION SYSTEM

(71) Applicant: Samsung Electronics Co., Ltd., Suwon-si (KR)

(72) Inventors: Fasil Abdul Latheef, Bangalore (IN); Jajohn Mathew Mattam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/984,525

(22) Filed: Aug. 4, 2020

(65) Prior Publication Data

US 2021/0045028 A1 Feb. 11, 2021

(30) Foreign Application Priority Data

Aug. 5, 2019 (IN) .............................. 201941031589
Jul. 2, 2020 (IN) .............................. 2019 41031589

(51) Int. Cl.
| | |
|---|---|
| *H04W 36/08* | (2009.01) |
| *H04W 36/30* | (2009.01) |
| *H04B 17/318* | (2015.01) |
| *H04W 36/00* | (2009.01) |
| *H04W 84/04* | (2009.01) |

(52) U.S. Cl.
CPC .......... *H04W 36/08* (2013.01); *H04B 17/318* (2015.01); *H04W 36/0085* (2018.08); *H04W 36/30* (2013.01); *H04W 84/042* (2013.01)

(58) Field of Classification Search
CPC . H04W 36/08; H04W 36/0085; H04W 36/30; H04W 84/042; H04W 48/18; H04W 48/12; H04W 48/16; H04B 17/318
See application file for complete search history.

(56) References Cited

U.S. PATENT DOCUMENTS

| | | | |
|---|---|---|---|
| 2019/0349825 A1* | 11/2019 | Tseng | H04W 48/18 |
| 2020/0322863 A1* | 10/2020 | Wang | H04W 48/18 |
| 2020/0359288 A1 | 11/2020 | Tang | |

FOREIGN PATENT DOCUMENTS

| | | |
|---|---|---|
| WO | 01/11911 A1 | 2/2001 |
| WO | 2011/141073 A1 | 11/2011 |

(Continued)

OTHER PUBLICATIONS

OPPO, 3GPP TSG-RAN WG2#100, R2-1712222, Discussion on EPC and 5GC Selection during Intra-LTE Handover with CN Type Change, Nov. 17, 2017, Reno, USA.

(Continued)

*Primary Examiner* — Chi H Pham
*Assistant Examiner* — Ji-Hae Yea
(74) *Attorney, Agent, or Firm* — Jefferson IP Law, LLP

(57) ABSTRACT

A method for handling cell selection in a wireless communication system is provided. The method includes detecting, by a UE, a plurality of neighboring LTE cells having a signal strength better than a serving LTE cell. Further, the method includes acquiring, by the UE, a SIB 1 type message from the detected plurality of neighboring LTE cells. Further, the method includes detecting, by the UE, a neighboring LTE cell from the detected plurality of neighboring cells to have a 5GC based on the acquired SIB 1 type message. Further, the method includes prioritizing selection of the neighboring LTE cell having the 5GC over the detected plurality of neighboring cells.

16 Claims, 8 Drawing Sheets

(56) References Cited

FOREIGN PATENT DOCUMENTS

| WO | 2012/125103 | A1 | | 9/2012 | |
| WO | 2012/174440 | A1 | | 12/2012 | |
| WO | 2018/131956 | A1 | | 7/2018 | |
| WO | 2019/095162 | A1 | | 5/2019 | |
| WO | WO-2019095162 | A1 | * | 5/2019 | ............ H04W 48/12 |
| WO | 2019/144399 | A1 | | 8/2019 | |

OTHER PUBLICATIONS

Intel Corporation, R1-1906798, 3GPP TSG RAN WG1 Meeting #97, In-device Coexistence Issues for eV2X Communication, May 4, 2019, Reno, USA.

ETSI TS 138 304 V15.4.0, 5G; NR; User Equipment (UE) procedures in idle mode and in RRC Inactive state, Jun. 29, 2019, Sophia Antipolis Cedex, France.

International Search Report dated Nov. 30, 2020, issued in International Patent Application No. PCT/KR2020/010277.

Indian Examination Report dated Nov. 10, 2021, issued in Indian Application No. 201941031589.

Samsung; Further considerations on the CN selection for E-UTRAN connected to 5G CN; 3GPP TSG-RAN WG2 Meeting #100; R2-1712171; Nov. 27-Dec. 1, 2017; Reno, USA.

3GPP; 3rd Generation Partnership Project; Technical Specification Group Radio Access Network; NR; User Equipment (UE) radio access capabilities (Release 15); 3GPP TS 38.306; V15.5.0; Mar. 2019; Valbonne, France.

European Search Report dated Jun. 10, 2022; European Appln. No. 20850312.8-1216/3967077 PCT/KR2020010277.

* cited by examiner

METHOD AND UE FOR HANDLING CELL SELECTION IN WIRELESS COMMUNICATION SYSTEM

CROSS-REFERENCE TO RELATED APPLICATION(S)

This application is based on and claims priority under 35 U.S.C. § 119(a) of an Indian Provisional patent application number 201941031589, filed on Aug. 5, 2019, in the Indian Intellectual Property Office, and of an Indian Complete patent application number 201941031589, filed on Jul. 2, 2020, in the Indian Intellectual Property Office, the disclosure of each of which is incorporated by reference herein in its entirety.

BACKGROUND

1. Field

The disclosure relates to wireless communication system, specifically related to a method and a User Equipment (UE) for handling cell selection in the wireless communication system. More particularly, the disclosure relates to the method and the UE to handle cell reselection when a Long Term Evolution (LTE) neighbor cell is connected to a $5^{th}$ generation Core (5GC) network to have better services.

2. Description of Related Art

FIG. 1A illustrates deployment of a LTE and a new radio (NR) to different core networks for standalone operations according to the related art. The LTE is connected to an Evolved Packet Core (EPC) and the NR is connected to a 5GC.

FIG. 1B illustrates the possible connections of Evolved Universal Terrestrial Radio Access (EUTRA) cells to the 5GC through WI code LTE_5GCN_connect-Core according to the related art.

Referring to FIGS. 1A and 1B, FIG. 1A shows an existing connection of RAN (eNB-LTE) connected to the core network (CN) whereas FIG. 1B shows the connection of RAN to the Core Network based on the new work item and decision by 3GPP. Hence, a network architecture deployed by network operators will be soon moving from the FIG. 1A to the FIG. 1B.

In the current deployment options of a $3^{rd}$ generation Partnership Project (3GPP), the Long Term Evolution (LTE) and New Radio (NR) are connected to different core networks for standalone operations. The LTE is connected to the EPC and the NR is connected to the 5GC. The 3GPP is working towards a possibility of the EUTRA cells connected to the 5GC through a Work Item (WI) code LTE_5GCN_connect-Core. Further, the deployment possibilities are LTE cells are connected to EPC, LTE cells are connected to 5GC, LTE cells are connected to both EPC and 5GC and NR cells are connected to 5GC.

The new deployment options of the LTE cell connected to the 5GC will give the below benefits, such as LTE connectivity to 5G-CN does not only allow Radio Access Network (RAN) level interworking but also provides a migration path where the core network is 5G-CN whereas radio remains LTE, high-performance mobility between the LTE and the NR, utilization of new functionalities provided by the 5G-CN such as Quality of Service (QoS) and slicing also together with a LTE radio interface and better support for low latency communication (URLLC).

According to 3GPP specification, NR: 38.304, section 5.2: When a UE is camped on a cell, the UE shall regularly search for a better cell according to the cell reselection criteria. If a better cell is found then, the better cell is selected. The change of cell may imply a change of Radio Access Technology (RAT). As defined in LTE: 36.304, section 5.2: When the UE is camped on a cell, the UE shall regularly search for a better cell according to the cell reselection criteria. If a better cell is found then, the better cell is selected. The change of cell may imply a change of RAT, or if the current and selected cell are both Evolved Universal Terrestrial Radio Access (EUTRA) cells, a change of the CN type happens.

In the LTE specifications, an LTE serving cell (i.e., eNB) is always connected to the EPC. With the introduction of the NR, the eNB may be connected either to the EPC or the 5G Core (5GC) network (normally known as NGeNB) or to both at the same time such as for the cells that support legacy LTE UEs and UEs that support NGeNB. Thus, on a neighbor frequency, there can be cells that connect to EPC and cells that connect to 5GC in the same area. Based on a RAN cell reselection procedure, the CN network is not considered for reselection and the CN type is not signalled along with the reselection priorities. The reselection is based on the priority configured per frequency layer for each RAT and also, the priority is configured for each layer and not the cell. In the same frequency, there can be cells connected to the 5GC (NGeNB) and the cells connected to EPC (eNB). There is no method to differentiate between these cells just based on the priority. If the CN is not considered for the reselection, this may result in device reselecting to the LTE cell which may be connected to Evolved Packet System (EPS) and will result in device not able to use the benefits of the 5GC and also the device cannot utilize the services of 5GC for a lesser duration.

FIG. 2 is a flow chart illustrating a reselection mechanism, according to a problem statement according to the related art.

Referring to FIG. 2, in a method 201, at operation 202, the UE is camped on the cell and reads the neighbor cell information. At operation 204, the method includes performing the reselection evaluation based on the neighbor cell information. At operation 206a, the method includes determining a high priority neighbor cell. The high priority neighbor cell is a cell having a higher priority (configured by the network) when compared with the serving cell. At operation 206b, the method includes determining an equal priority neighbor cell. The equal priority neighbor cell is a cell having same priority (configured by network) when compared with the serving cell. At operation 206c, the method includes determining a low priority neighbor cell. The low priority neighbor cell is a cell having lower priority (configured by network) when compared with the serving cell. At operation 208a, the method includes determining that a reselection criteria is met if the neighbor cell fulfils a Squal/Srxlev>ThreshXhigh during a time interval treselctionRAT. The time interval treselctionRAT is a threshold which is set by the network operator. Squal/Srxlev should be better than this threshold for a high priority cell.

At operation 208b, the method includes determining that the reselection will be based on the ranking of serving and neighboring cells. At operation 208c, the method includes determining that the reselection criteria is met if neighbor cell fulfils Squal/Srxlev>ThreshXlow and serving cell fulfils Squal/Srxlev<Threshservinglow during a time interval TreslectionRAT. At operation 210, the method includes reselecting to the cell ranked as the best cell among all the cells on the highest priority frequency meeting the reselection criteria.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address the above-mentioned problems and/or disadvantages and to provide at least the advantages described below. Accordingly, an aspect of the disclosure is to provide a UE and a method to handle cell reselection when a LTE neighbor cell is connected to a 5GC Network to have better services.

Another aspect of the disclosure is to identify, by the UE, a CN type from a target cell during a reselection evaluation procedure.

Another aspect of the disclosure is to reprioritize candidate cells according to a connected CN type for reselection procedure.

Another aspect of the disclosure is to perform reselection by taking into account CN type in addition to network signaled priorities.

Another aspect of the disclosure is to delay a reselection when the neighbor cells which met the reselection criteria does not connect to 5GC and evaluation of cells connected to 5GC is ongoing.

Additional aspects will be set forth in part in the description which follows and, in part, will be apparent from the description, or may be learned by practice of the presented embodiments.

In accordance with an aspect of the disclosure, a method for handling cell selection in a wireless communication system to a LTE cell is provided. The method includes detecting, by a UE, a plurality of neighboring LTE cells having a signal strength better than a serving LTE cell. Further, the method includes acquiring, by the UE, a system information block (SIB) 1 type message from the detected plurality of neighboring LTE cells. Further, the method includes detecting, by the UE, at least one neighboring LTE cell from the detected plurality of neighboring cells to have a 5GC based on the acquired SIB 1 type message. Further, the method includes prioritizing selection of the at least one neighboring LTE cell having the 5GCover the detected plurality of neighboring cells.

In accordance with another aspect of the disclosure, a UE for handling cell selection in a wireless communication system to a LTE cell is provided. The UE includes a processor coupled with a memory. The processor is configured to detect a plurality of neighboring LTE cells having a signal strength better than a serving LTE cell. Further, the processor is configured to acquire a SIB 1 type message from the detected plurality of neighboring LTE cells. Further, the processor is configured to detect a neighboring LTE cell from the detected plurality of neighboring cells to have a 5GC connectivity based on the acquired SIB 1 type message. Further, the processor is configured to prioritize selection of the neighboring LTE cell having the 5GC connectivity over the detected plurality of neighboring cells.

In an embodiment, prioritize the selection of the neighboring LTE cell having the 5GC connectivity over the detected plurality of neighboring cells includes determine a priority of each of neighboring LTE cell from the detected plurality of the neighboring LTE cells, rank the detected plurality of the neighboring LTE cells based on the priority of each of neighboring LTE cell and the signal strength of each of neighboring LTE cell, and select the neighboring LTE cell having a highest rank over the detected plurality of neighboring cells.

In an embodiment, detect the plurality of neighboring LTE cells having the signal strength better than the serving LTE cell includes detect a plurality of signal parameters of the plurality of neighboring LTE cells, wherein the plurality of signal parameters include one of a Reference Signals Received Power (RSRP), Reference Signal Received Quality (RSRQ) and a radio condition, and detect the plurality of neighboring LTE cells having the signal strength better than the serving LTE cell based on the plurality of detected signal parameters of the plurality of neighboring LTE cells.

In an embodiment, detect the neighboring LTE cell from the detected plurality of neighboring cells to have the 5GC connectivity includes read neighbor cell information based on the acquired SIB 1 type message, compare a priority of the serving LTE cell having the signal strength with a priority of the neighboring cell having a signal strength based on the neighbor cell information, and detect the neighboring LTE cell from the detected plurality of neighboring cells to have the 5GC connectivity based on the comparison.

In an embodiment, the neighbor cell information comprises a list of PLMNs in the neighboring cell that are connected to the 5GC connectivity and associated priorities.

In an embodiment, rank the detected plurality of the neighboring LTE cells based on the priority of each of neighboring LTE cell, the signal strength of each of neighboring LTE cell, and the 5GC connectivity of each of neighboring LTE cell includes detect that the determination of the 5GC connectivity of the at least one neighboring LTE cell from the detected plurality of the neighboring LTE is ongoing, and rank the detected plurality of neighboring LTE cells after the determination of 5GC connectivity of the at least one neighboring LTE cell from the detected plurality of the neighboring LTE cells is completed.

In an embodiment, rank the detected plurality of the neighboring LTE cells based on the priority of each of neighboring LTE cell and the signal strength of each of neighboring LTE cell includes start a timer, determine that at least one neighboring LTE cell from the detected plurality of the neighboring LTE cells is connected to the 5GC in an ongoing state, and perform one of: in response to determine that the at least one neighboring LTE cell connected to the 5GC is completed, stop the timer and rank the at least one neighboring LTE cell, and in response to determine that the at least one neighbor cell connected to the 5GC connectivity is not completed, rank the at least one neighboring LTE cell based on a high priority frequency associated with each of neighboring LTE cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
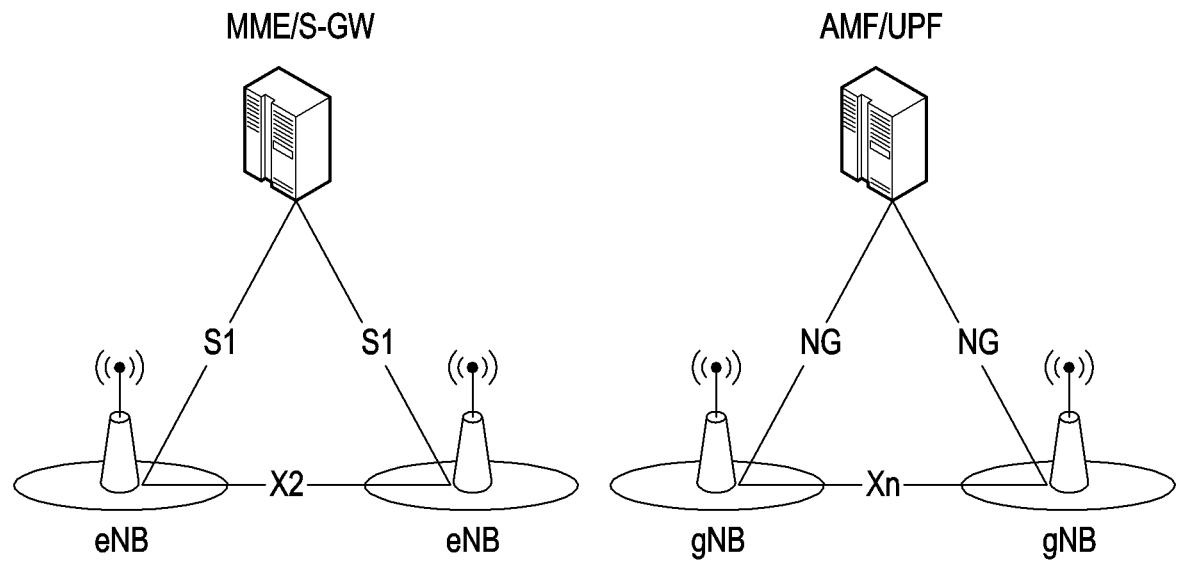
FIG. 1A illustrates deployment of LTE and NR to different core networks for standalone operations according to the related art.
Figure 1B:
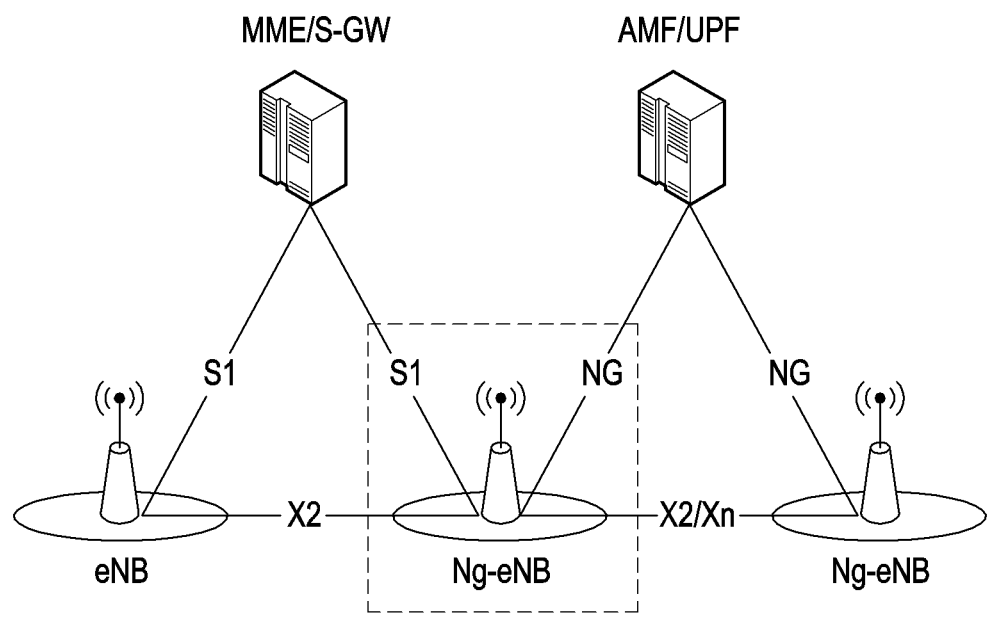
FIG. 1B illustrates the possible connections of EUTRA cells to 5GC through WI code LTE_5GCN_connect-Core according to the related art.
Figure 2:
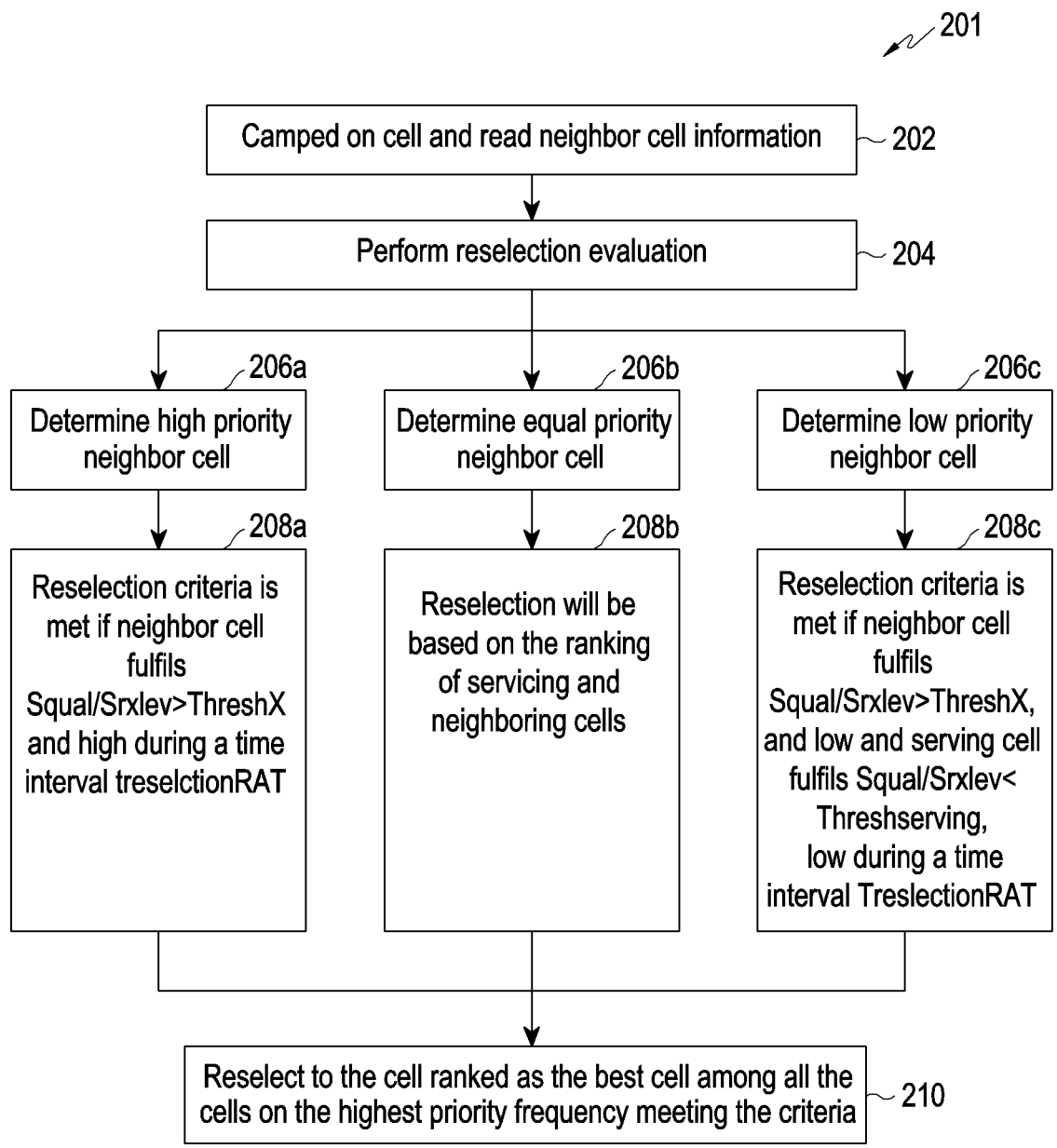
FIG. 2 is a flow chart illustrating a reselection mechanism, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules and the like, are physically implemented by analog or digital circuits such as logic gates, integrated circuits, microprocessors, microcontrollers, memory circuits, passive electronic components, active electronic components, optical components, hard-wired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for handling cell selection in a wireless communication system. The method includes detecting, by a UE, a plurality of neighboring LTE cells having a signal strength better than a serving LTE cell. Further, the method includes acquiring, by the UE, a SIB 1 type message from the detected plurality of neighboring LTE cells. Further, the method includes detecting, by the UE, a neighboring LTE cell from the detected plurality of neighboring cells to have a 5GC based on the acquired SIB 1 type message. Further, the method includes prioritizing selection of the neighboring LTE cell having the 5GCover the detected plurality of neighboring cells.

Unlike systems and methods of the related art, the proposed method can be used to handle cell reselection when the LTE neighbor cell is connected to the 5GC network in order to provide improved services and mobility. In the proposed methods, the mobility is realized only in the connected state. The proposed method can be used to optimize reselection procedure by taking the connected core network into account. In the proposed method, a PLMN list connected to 5GC is used for prioritizing the cell during reselection or in other words, the UE will consider PLMN-Identity-5GC to determine if the cell is connected to 5GC to prioritize the cell for reselection. In the proposed methods, by continuing in the 5GC network when compared to EPS, the UE can continue utilizing new functionalities provided by the 5G-CN such as quality of service (QoS) and network slicing. The network slicing provides a network that is logically independent and has different attributes on the same physical network. In other words, by the proposed methods, two services with completely different requirements can be deployed on a network that is independent of each other. For example, augmented reality (AR)/virtual reality (VR) services consist of a combination of high bandwidth services, a certain level of QoS, and network functions suitable for low delay, and, if numerous sensors are connected, low bandwidth, some packet loss is acceptable, but very low power-driven network functions. By the proposed methods, as the devices or ranges connected increase, more resources can be dynamically allocated to respond to scale expansion. In the 5GC, the UE will get better support for low latency communication (URLLC). By using the proposed reselection mechanisms, the UE can utilize features provided by 5GC for longer duration.

In an example, In SIB 1, the base station will send the list of PLMNs that can be connected to 5GC. Below is from 3GPP 36.331, v15.6.0—SIB 1 contents

```
PLMN-IdentityList-r15::= SEQUENCE (SIZE (1 .. maxPLMN- r11)) OF PLMN-
        IdentityInfo-r15
PLMN-IdentityInfo-r15:: = SEQUENCE {
    plmn-Identity-5GC-r15                       CHOICE {
        plmn-Identity-r15                           PLMN-Identity,
        plmn-Index-r15                              INTEGER (1 .. maxPLMN-r11 )
    }
    cellReservedForOperatorUse-r15              ENUMERATED {reserved,
        notReserved},
    cellReservedForOperatorUse-CRS-r15             ENUMERATED {reserved,
        notReserved}
}
```

Referring now to the drawings, and more particularly to FIGS. 3A to 3C, 4, 5, and 6A to 6C, there are shown preferred embodiments.

Figure 3A:
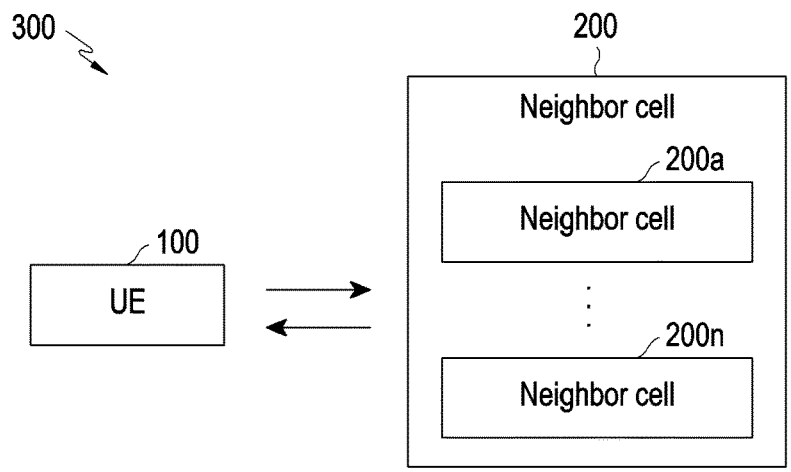
FIG. 3A is a schematic view of a UE for handling cell selection in a wireless communication system according to an embodiment of the disclosure.

FIG. 3A is a schematic view of a UE for handling cell selection in a wireless communication system, according to an embodiment of the disclosure.

Referring to FIG. 3A, in an embodiment, wireless communication system 300 includes a UE 100 and a plurality of neighbor cells 200a-200n. Hereafter, the label of the neighbor cell is 200. The UE 100 can be, for example, but not limited to a cellular phone, a smart phone, a Personal Digital Assistant (PDA), a wireless modem, a tablet computer, a laptop computer, an Internet of Things (IoT) or the like.

According to the proposed method, consider the CN type while evaluating the reselection criteria. The proposed method is applicable when there is a reselection from NR to LTE, LTE to LTE and any other RAT to LTE (e.g.: WCDMA to LTE). There are multiple cases to be considered here:

Reselection criteria are met for multiple LTE cells which are connected to 5GC.

Reselection criteria are met for multiple LTE cells which are connected to LTE CN but the evaluation for LTE cells connected to 5GC is ongoing.

Case 1: If the cell reselection criteria is met for multiple cells which are connected to 5GC and/or LTE CN, the highest priority cell in the PLMN list which is connected to 5GC should be selected.

Case 2: If the cell reselection criteria is met for multiple cells which are connected to LTE CN and if the evaluation for some cells connected to 5GC are ongoing (considering these will satisfy the reselection criteria), the UE 100 may choose to wait for the evaluation of these cells to be completed and reselect to the one which is connected to 5GC.

Case 3: For the case 2 mentioned above, if the UE 100 is not able to successfully reselect to the cell (for a certain number of times or for certain duration) which is connected to 5GC even after waiting for completing the evaluation of cells connected to 5GC, the UE 100 may choose to reselect to LTE cell which is connected to LTE CN.

In an embodiment, the UE 100 is configured to acquire a SIB 1 type message from at least one neighbor cell among the plurality of neighbor cells 200. Based on the acquired SIB 1 type message, the UE 100 is configured to determine a type of a CN connectivity of the at least one neighbor cell. Acquiring of the SIB from the communication system 300 may be done by reading the SIB messages broadcasted by the communication system 300 or transmitted by the communication system 300 on a specific request.

If the list of PLMNs is broadcasted in the SIB 1 of the target cell, it indicates that the cell is connected to 5GC.

Further, the UE 100 is configured to determine that the UE 100 supports a cell reselection criteria based on a predefined threshold. The cell reselection criteria indicates that the at least one neighbor cell is connected with a 5GC and a priority of the at least one neighbor cell connected with the 5GC is greater than or equal to a serving cell.

In an embodiment, the type of the CN connectivity is determined by parsing the acquired SIB 1 message, reading neighbor cell information based on the parsing, wherein the neighbor cell information comprises a list of PLMNs that is connected to the 5GC, comparing a priority of a serving cell with a priority of the at least one neighbor cell based on the neighbor cell information, and determining the type of the CN connectivity based on the comparison.

Based on the determined type of the CN connectivity and the cell reselection criteria, the UE 100 is configured to rank the at least one neighbor cell.

Further, the UE 100 is configured to select a candidate cell from the at least one ranked neighbor cell based on the determined type of the CN connectivity and the cell reselection criteria, wherein the candidate cell is connected with the 5GC.

In an embodiment, the UE 100 is configured to determine that the at least one neighbor cell is connected to the 5GC in an ongoing state and wait determination of the 5GC ongoing is completed. Further, the UE 100 is configured to rank the at least one neighbor cell based on the completion of the ongoing state.

Figure 3B:
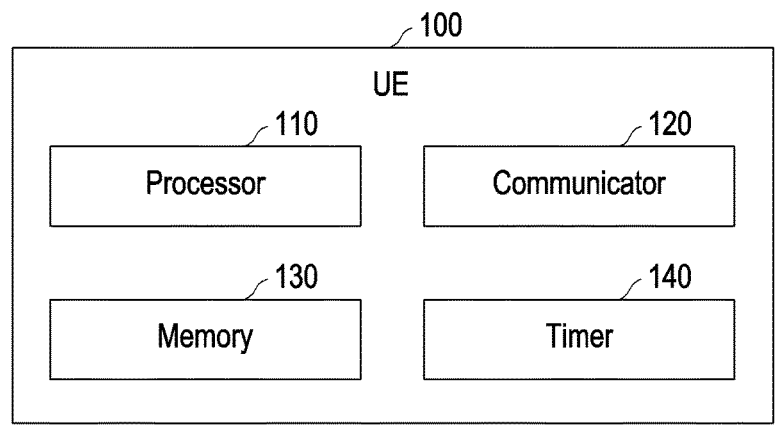
FIG. 3B shows various hardware components of a UE according to an embodiment of the disclosure.

In an embodiment, the UE 100 is configured to start a timer 140 in FIG. 3B, and determine that the at least one neighbor cell is connected to the 5GC ongoing. Further, the UE 100 is configured to wait determination of the 5GC ongoing is completed and determine the at least one neighbor cell connected to the 5GC is valid for the cell reselection criteria. If the at least one neighbor cell connected to 5GC is valid for the cell reselection criteria, the UE 100 stops the timer 140 and ranks the at least one neighbor cell connected to 5GC and being valid for the cell reselection criteria. In another embodiment, if the at least one neighbor cell connected to 5GC is not valid for the cell reselection criteria, the UE 100 determines a value associated with the timer 140 meets a threshold level.

In an embodiment, the UE 100 is configured to determine that the at least one neighbor cell is connected to the 5GC ongoing if the value associated with the timer 140 does meet the threshold level.

In another embodiment, the UE 100 is further configured to select the candidate cell based on a high priority frequency if the value associated with the timer 140 does meet the threshold level.

FIG. 3B shows various hardware components of a UE 100, according to an embodiment of the disclosure.

Referring to FIG. 3B, the UE 100 comprises at least one processor 110, a communicator 120, a memory 130, and a timer 140. The processor 110 is coupled with the communicator 120, the memory 130, and the timer 140. A value of the timer 140 is implementation dependent.

The processor 110 is configured to execute instructions stored in the memory 130 and to perform various processes. The communicator 120 is configured for communicating internally between internal hardware components and with external devices via one or more networks.

The memory 130 stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

In an embodiment, the processor 110 is configured to acquire the SIB 1 type message from the at least one neighbor cell among the plurality of neighbor cells 200. Based on the acquired SIB 1 type message, the processor 110 is configured to determine the type of the CN connectivity of the at least one neighbor cell. Further, the processor 110 is configured to determine that the processor 110 supports the cell reselection criteria based on the predefined threshold. The cell reselection criteria indicates that the at least one neighbor cell is connected with the 5GC and the priority of the at least one neighbor cell is greater than or equal to the priority of the serving cell.

Based on the determined type of the CN connectivity and the cell reselection criteria, the processor 110 is configured to rank the at least one neighbor cell.

Further, the processor 110 is configured to select the candidate cell from the at least one ranked neighbor cell based on the determined type of the CN connectivity and the cell reselection criteria, wherein the candidate cell is connected with the 5GC.

In an embodiment, the processor 110 is configured to determine that the at least one neighbor cell is connected to the 5GC in an ongoing state and wait determination of the 5GC ongoing is completed. Further, the processor 110 is configured to rank the at least one neighbor cell based on the completion of the ongoing state.

In an embodiment, the processor 110 is configured to start the timer 140 when determine that the at least one neighbor cell is connected to the 5GC ongoing. Further, the processor 110 is configured to wait determination of the 5GC ongoing is completed and determine the at least one neighbor cell connected to the 5GC is valid for the cell reselection criteria. If the at least one neighbor cell connected to 5GC is valid for the cell reselection criteria, the processor 110 stops the timer 140 and ranks the at least one neighbor cell connected to 5GC and being valid for the cell reselection criteria. In another embodiment, if the at least one neighbor cell connected to 5GC is not valid for the cell reselection criteria, the processor 110 determines the value associated with the timer 140 meets the threshold level.

In an embodiment, the processor 110 is configured to determine that the at least one neighbor cell is connected to the 5GC ongoing if the value associated with the timer 140 does meet the threshold level.

In another embodiment, the processor 110 is further configured to select the candidate cell based on a high priority frequency if the value associated with the timer 140 does meet the threshold level.

In an embodiment, the processor 110 is configured to detect the plurality of neighboring LTE cells having the signal strength better than a serving LTE cell. Further, the processor 110 is configured to acquire the SIB 1 type message from the detected plurality of neighboring LTE cells. In an embodiment, the neighboring LTE cell from the detected plurality of neighboring cells to have the 5GC connectivity is detected by reading neighbor cell information based on the acquired SIB 1 type message, comparing the priority of the serving LTE cell with the priority of the neighboring cell based on the neighbor cell information and the signal strength, and detecting the neighboring LTE cell from the detected plurality of neighboring cells to have the 5GC connectivity based on the comparison. In an embodiment, the neighbor cell information comprises a list of PLMNs that are connected to the 5GC.

Further, the processor 110 is configured to detect the neighboring LTE cell from the detected plurality of neighboring cells to have the 5GC connectivity based on the acquired SIB 1 type message.

Further, the processor 110 is configured to prioritize selection of the neighboring LTE cell having the 5GC connectivity over the detected plurality of neighboring cells. In an embodiment, the selection of the neighboring LTE cell having the 5GC connectivity over the detected plurality of neighboring cells is prioritized by determining a priority of each of neighboring LTE cell from the detected plurality of the neighboring LTE cells, ranking the detected plurality of the neighboring LTE cells based on the priority of each of neighboring LTE cell and the signal strength of each of neighboring LTE cell, and selecting the neighboring LTE cell having a highest rank over the detected plurality of neighboring cells.

In an embodiment, the detected plurality of the neighboring LTE cells is ranked by determining that at least one neighboring LTE cell from the detected plurality of the neighboring LTE cells is connected to the 5GC in an ongoing state, and ranking the at least one neighboring LTE cell after completing the at least one neighboring LTE cell from the detected plurality of the neighboring LTE cells is connected to the 5GC.

In an embodiment, the detected plurality of the neighboring LTE cells is ranked by starting a timer 140, it is determined that at least one neighboring LTE cell from the detected plurality of the neighboring LTE cells is connected to the 5GC in an ongoing state, and it is performed one of: in response to determine that the at least one neighboring LTE cell connected to the 5GC is completed, the UE 100 stops the timer 140 and ranks the at least one neighboring LTE cell, and in response to determine that the at least one neighbor cell connected to the 5GC connectivity is not completed, ranks the at least one neighboring LTE cell based on a high priority frequency associated with each of neighboring LTE cell.

Although the FIG. 3B shows various hardware components of the UE 100 but it is to be understood that other embodiments are not limited thereon. In other embodiments, the UE 100 may include less or more number of components. Further, the labels or names of the components are used only for illustrative purpose and does not limit the scope. One or more components can be combined together to perform same or substantially similar function to handle the cell selection in the wireless communication system 300.

Figure 3C:
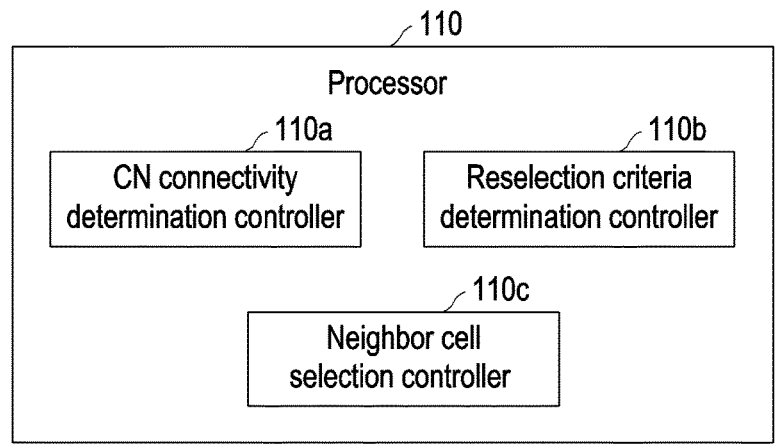
FIG. 3C shows various hardware components of a processor included in a UE according to an embodiment of the disclosure.

FIG. 3C shows various hardware components of a processor 110 included in a UE 100, according to an embodiment of the disclosure.

Referring to FIG. 3C, the processor 110 includes a CN connectivity determination controller 110a, a reselection criteria determination controller 110b, and a neighbor cell selection controller 110c. The CN connectivity determination controller 110a is coupled with the reselection criteria determination controller 110b, and the neighbor cell selection controller 110c.

In an embodiment, the CN connectivity determination controller 110a is configured to acquire the SIB 1 type message from the at least one neighbor cell among the plurality of neighbor cells 200. Based on the acquired SIB 1 type message, the CN connectivity determination controller 110a is configured to determine the type of the CN connectivity of the at least one neighbor cell. Further, the reselection criteria determination controller 110b is configured to determine that the UE 100 supports the cell reselection criteria based on the predefined threshold. Based on the determined type of the CN connectivity and the cell reselection criteria, the neighbor cell selection controller 110c is configured to rank the at least one neighbor cell.

Further, the neighbor cell selection controller 110c is configured to select the candidate cell from the at least one ranked neighbor cell based on the determined type of the CN connectivity and the cell reselection criteria, wherein the candidate cell is connected with the 5GC.

In an embodiment, the neighbor cell selection controller 110c is configured to determine that the at least one neighbor cell is connected to the 5GC in an ongoing state and wait determination of the 5GC ongoing is completed. Further, the neighbor cell selection controller 110c is configured to rank the at least one neighbor cell based on the completion of the ongoing state.

In an embodiment, the neighbor cell selection controller 110c is configured to start the timer 140 and determine that the at least one neighbor cell is connected to the 5GC ongoing. Further, the neighbor cell selection controller 110c is configured to wait determination of the 5GC ongoing is completed and determine the at least one neighbor cell connected to the 5GC is valid for the cell reselection criteria. If the at least one neighbor cell connected to 5GC is valid for the cell reselection criteria, the neighbor cell selection controller 110c stops the timer 140 and ranks the at least one neighbor cell connected to 5GC and being valid for the cell reselection criteria. In another embodiment, if the at least one neighbor cell connected to 5GC is not valid for the cell reselection criteria, the neighbor cell selection controller 110c determines the value associated with the timer 140 meets the threshold level.

In an embodiment, the neighbor cell selection controller 110c is configured to determine that the at least one neighbor cell is connected to the 5GC ongoing if the value associated with the timer 140 does meet the threshold level.

In another embodiment, the neighbor cell selection controller 110c is further configured to select the candidate cell based on a high priority frequency if the value associated with the timer 140 does meet the threshold level.

In an embodiment, the neighbor cell selection controller 110c is configured to detect the plurality of neighboring LTE cells having the signal strength better than the serving LTE cell. Further, the neighbor cell selection controller 110c is configured to acquire the SIB 1 type message from the detected plurality of neighboring LTE cells. Further, the neighbor cell selection controller 110c is configured to detect the neighboring LTE cell from the detected plurality of neighboring cells to have the 5GC connectivity based on the acquired SIB 1 type message using the CN connectivity determination controller 110a. Further, the neighbor cell selection controller 110c is configured to prioritize selection of the neighboring LTE cell having the 5GC connectivity over the detected plurality of neighboring cells using the reselection criteria determination controller 110b.

Although the FIG. 3C shows various hardware components of the processor 110 but it is to be understood that other embodiments are not limited thereon. In other embodiments, the processor 110 may include less or more number of components. Further, the labels or names of the components are used only for illustrative purpose and does not limit the scope. One or more components can be combined together to perform same or substantially similar function to handle the cell selection in the wireless communication system 300.

Figure 4:
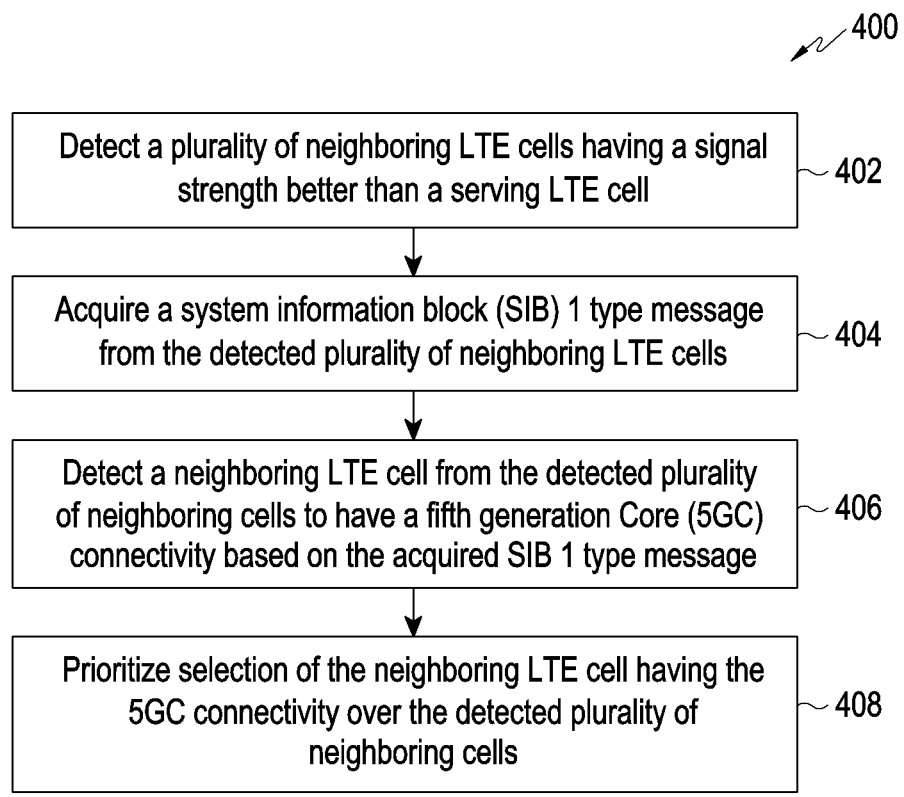
FIG. 4 is a flow chart illustrating a method for handling cell selection in a wireless communication system according to an embodiment of the disclosure.

FIG. 4 is a flow chart illustrating a method for handling cell selection in a wireless communication system 300, according to an embodiment of the disclosure.

Referring to FIG. 4, in a method 400, operations 402 to 408 are implemented by the processor 110. At operation 402, the method includes detecting the plurality of neighboring LTE cells having the signal strength better than the serving LTE cell. At operation 404, the method includes acquiring the SIB 1 type message from the detected plurality of neighboring LTE cells. At operation 406, the method includes detecting the neighboring LTE cell from the detected plurality of neighboring cells to have the 5GC connectivity based on the acquired SIB 1 type message. At operation 408, the method includes prioritizing selection of the neighboring LTE cell having the 5GC connectivity over the detected plurality of neighboring cells.

Figure 5:
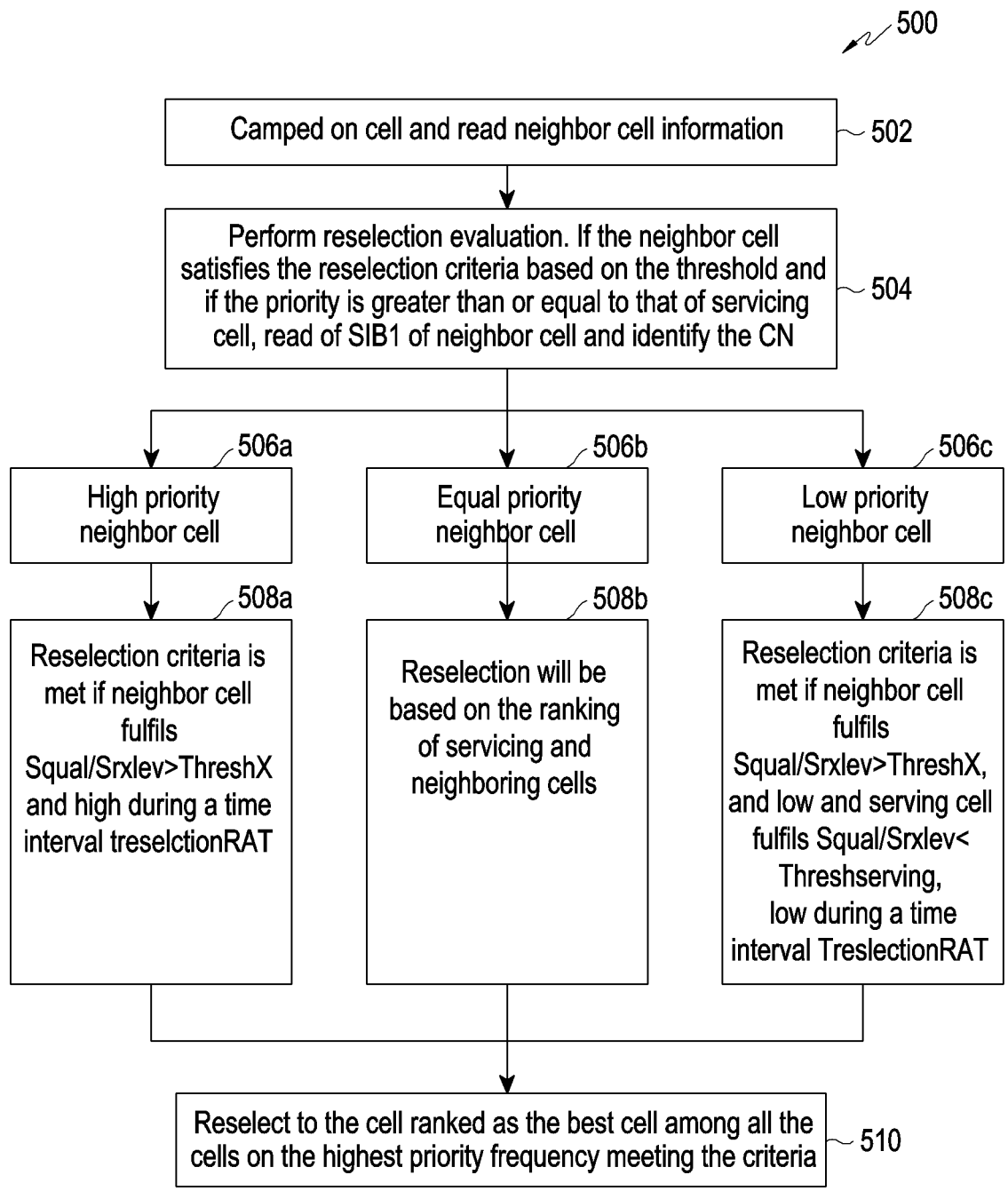
FIG. 5 is an example flow diagram illustrating cell reselection when multiple cells meet a reselection criteria at the same time and LTE cells connected to 5GC are present according to an embodiment of the disclosure.

FIG. 5 is an example flow diagram illustrating cell reselection when multiple cells meet a reselection criteria at the same time and LTE cells connected to 5GC are present, according to an embodiment of the disclosure.

In an example, when the UE 100 is camped to the serving cell, read the neighbor cell information and start performing the evaluation of the neighbor cells when it is applicable. Further, the UE 100 reads the SIB1 of the higher or equal priority neighbor cells when compared to the serving cell and identifies the type of the CN connectivity. If multiple neighbor cells are meeting the reselection criteria at the same time and if some of the LTE cells are connected to 5GC: consider the LTE cells with the type of CN connectivity as 5GC as more priority cells, reselect to the LTE cell which is ranked best among all the cells which are connected to 5GC.

Referring to FIG. 5, in a method 5, at operation 502, the UE 100 is camped on the serving cell and reads the neighbor cell information. At operation 504, the method includes performing the reselection evaluation if the neighbor cell satisfies the reselection criteria based on the threshold and if the priority is greater than or equal to the priority of serving cell, read of SIB1 of neighbor cell and identify the type of the CN connectivity. At operation 506*a*, the method includes determining the high priority neighbor cell. At operation 506*b*, the method includes determining the equal priority neighbor cell. At operation 506*c*, the method includes determining the low priority neighbor cell. At operation 508*a*, the method includes determining that the reselection criteria is met if neighbor cell fulfils Squal/Srxlev>ThreshXhigh during a time interval treselctionRAT. At operation 508*b*, the method includes determining that the reselection will be based on the ranking of serving cell and neighboring cells. At operation 508*c*, the method includes determining that the reselection criteria is met if neighbor cell fulfils Squal/Srxlev>ThreshXlow and serving cell fulfils Squal/Srxlev<Threshservinglow during a time interval TreslectionRAT. At operation 510, the method includes reselecting to the cell ranked as the best cell among all the cells on the highest priority frequency meeting the reselection criteria.

FIG. 6 is an example flow diagram illustrating cell reselection when multiple cells meet a criteria at the same time and none of LTE cells connected to 5GC and if there are reselection failures to cells connected to the 5GC, according to an embodiment of the disclosure.

Referring to FIG. 6, when the UE 100 is camped to the serving cell, read the neighbor cell information and starts performing the evaluation of the neighbor cells when it is applicable. The UE 100 reads the SIB 1 of the higher or equal priority neighbor cells when compared to the serving cell and identify the type of the CN connectivity. If multiple cells are meeting the reselection criteria at the same time and none of the LTE cells are connected to 5GC. The UE 100 checks if any of the neighbor cells whose evaluation is ongoing connected to 5GC and is a proper candidate to meet the reselection criteria: If there are such cells, continue the evaluation of those cells which already met the criteria and for the cells whose evaluation is ongoing. Once the evaluation is complete, the UE 100 checks for the reselection criteria of all the cells. Further, the UE 100 reselects to the cell which is ranked best among all the cells which are connected to 5GC.

It is possible that after the completion of evaluation of neighbor cells, there are no cells connected to 5GC is available. This should not result in unnecessary delay in the reselection procedure. Hence the timer 140 and threshold should be introduced to the solution.

If multiple cells are meeting the reselection criteria at the same time and none of the LTE cells are connected to 5GC,
Start the timer T 140.

Check if any of the neighbor cells whose evaluation is ongoing connected to 5GC and is a proper candidate to meet the reselection criteria: If there are such cells, continue the evaluation of those cells which already met the criteria and for the cells whose evaluation is ongoing. Once the evaluation is complete, check for the reselection criteria of all the cells. If the reselection criteria is not met for the cells connected to 5GC, continue the evaluation (keeping the condition of cells connected to 5GC is under the evaluation) until the timer T is reaching the threshold. If the device can find a cell which is connected to 5GC before T=Threshold, it can reselect to the cell.

Threshold can be a configurable value. The preferable threshold value can be approximately 2*(Treselection time), i.e. 2 times the Treselection time.

The main advantages of the preferred embodiment are: by continuing in 5GC network when compared to EPS, the device can continue utilizing new functionalities provided by the 5G-CN such as QoS and slicing, device will get better Support for low latency communication (URLLC) in 5GC, device can utilize features provided by 5GC for longer duration.

Figure 6A:
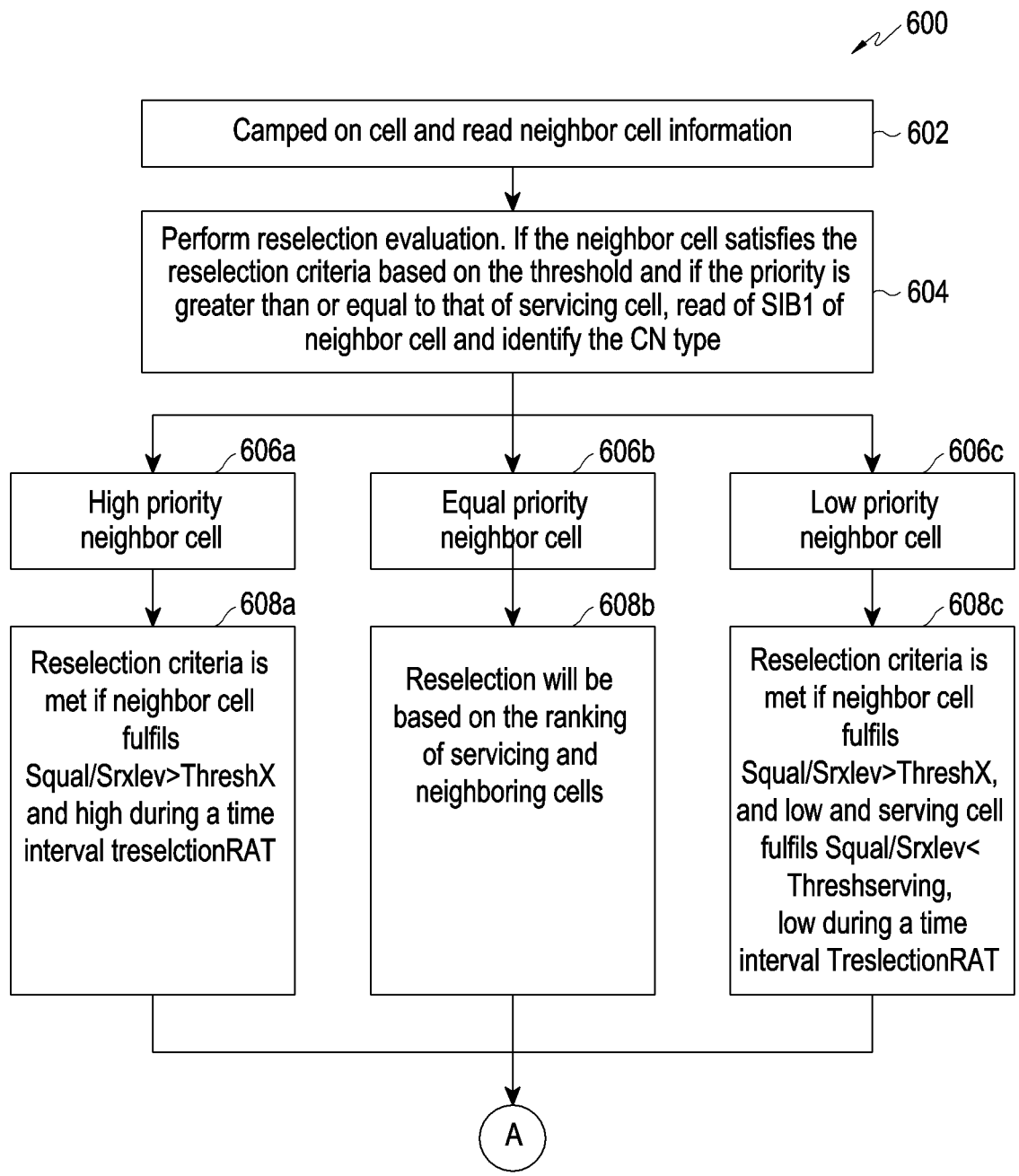
FIGS. 6A, 6B, and 6C, are example flow diagrams illustrating cell reselection when multiple cells meet a criteria at the same time and none of an LTE cells connected to a 5GC and if there are reselection failures to cells connected to the 5GC, according to various embodiments of the disclosure.
Figure 6B:
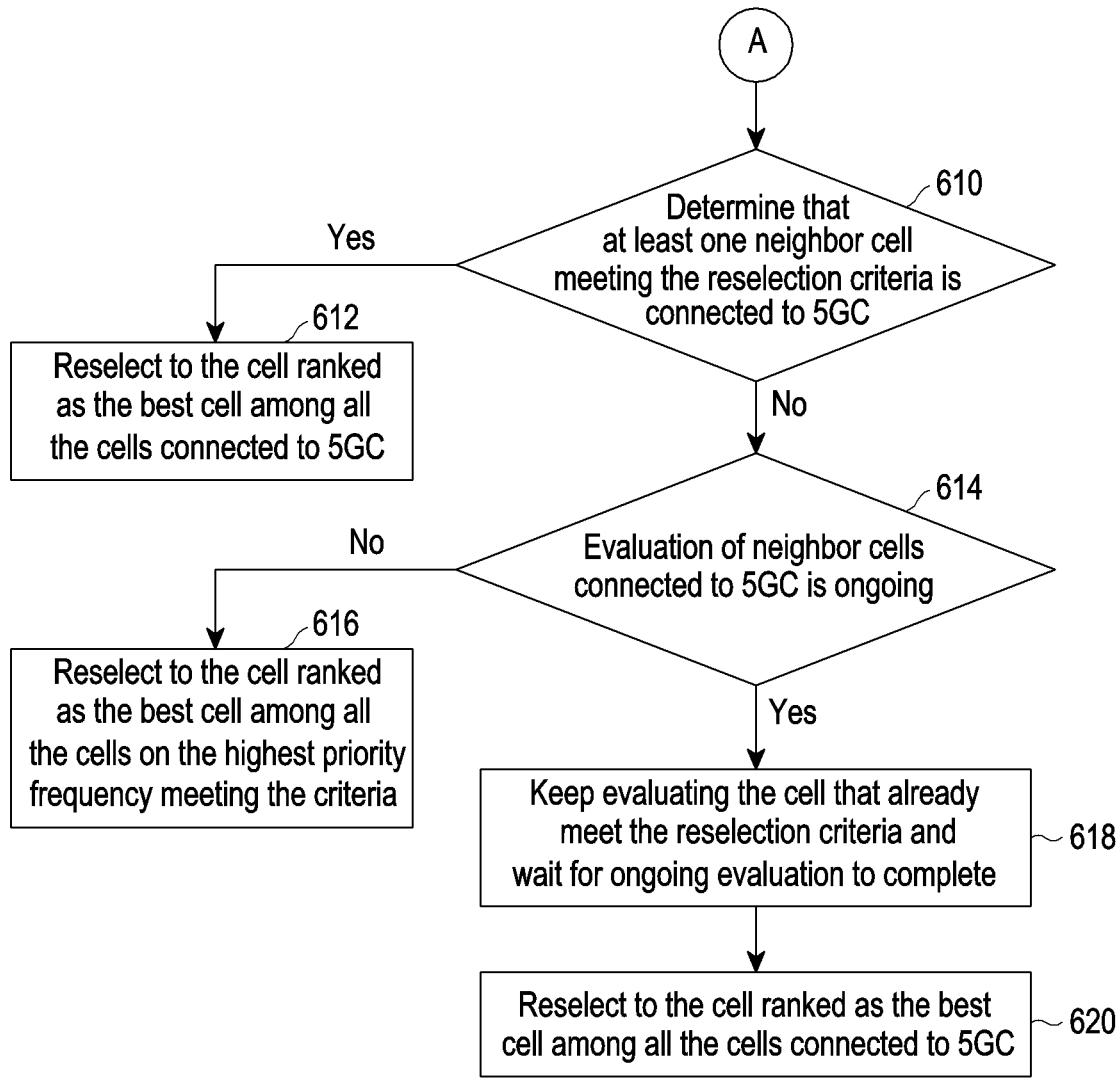
Figure 6C:
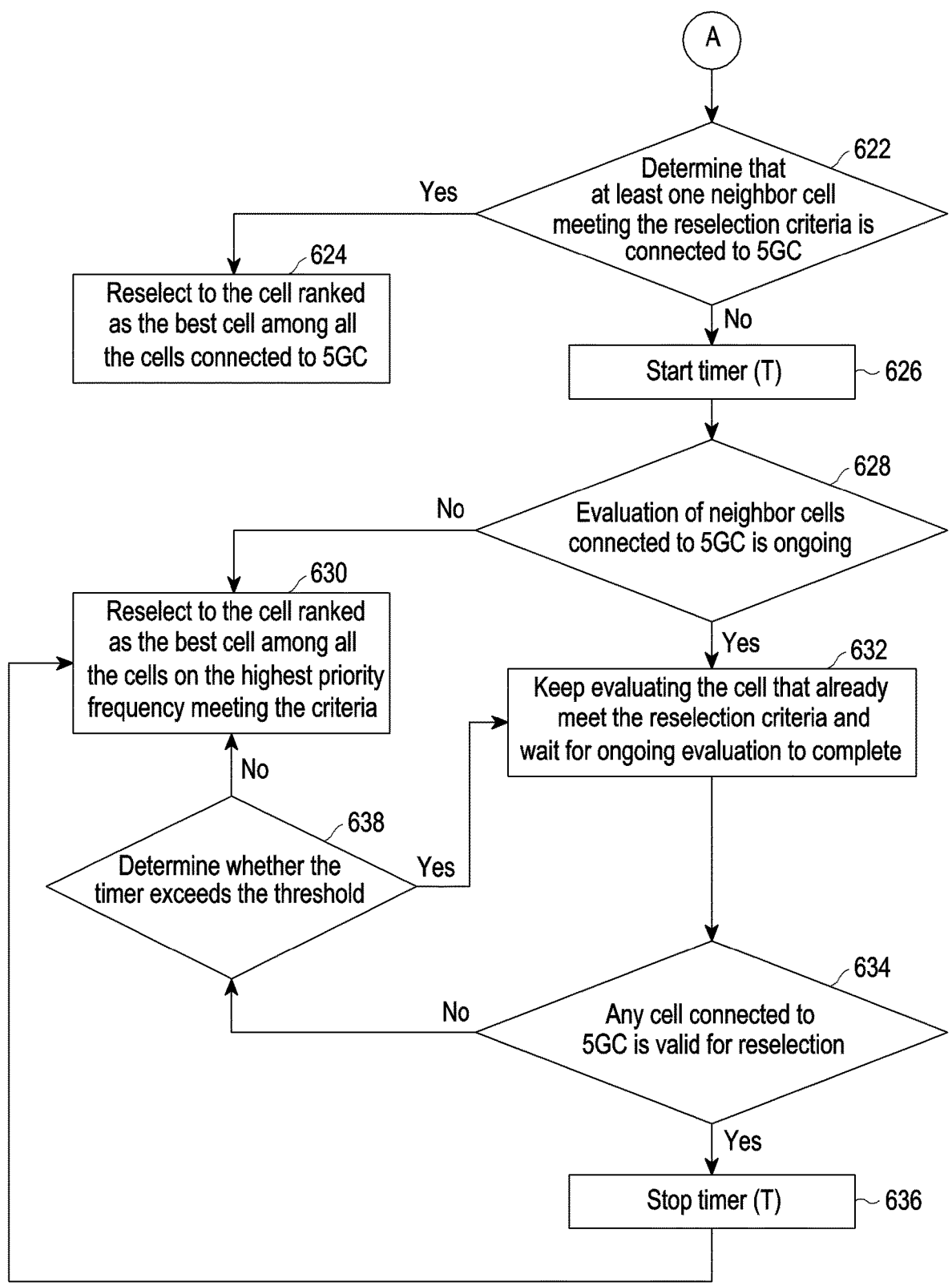

Referring to FIGS. 6A, 6B, and 6C, at operation 602, the UE 100 is camped on the serving cell and read neighbor cell information. At operation 604, the method includes performing the reselection evaluation if the neighbor cell satisfies the reselection criteria based on the threshold and if the priority is greater than or equal to the priority of serving cell, reading the SIB1 of neighbor cell and identifying the type of the CN connectivity. At operation 606*a*, the method includes determining the high priority neighbor cell. At operation 606*b*, the method includes determining the equal priority neighbor cell. At operation 606*c*, the method includes determining the low priority neighbor cell. At operation 608*a*, the method includes determining that the reselection criteria is met if neighbor cell fulfils Squal/Srxlev>ThreshXhigh during a time interval treselctionRAT. At operation 608*b*, the method includes determining that the reselection will be based on the ranking of serving and neighboring cells. At operation 608*c*, the method includes determining that the reselection criteria is met if neighbor cell fulfils Squal/Srxlev>ThreshXlow and serving cell fulfils Squal/Srxlev<Threshservinglow during a time interval TreslectionRAT.

At operation 610, the method includes determining whether the at least one neighbor cell meeting the reselection criteria is connected to the 5GC.

If the at least one neighbor cell meeting the reselection criteria is connected to the 5GC then, at operation 612, the method includes reselecting to the cell ranked as the best cell among all the cells connected to the 5GC.

If the at least one neighbor cell meeting the reselection criteria is not connected to the 5GC then, at operation 614, the method includes determining whether the evaluation of neighbor cells connected to 5GC is ongoing.

If the evaluation of neighbor cells connected to 5GC is not ongoing then, at operation 616, the method includes reselecting to the cell ranked as the best cell among all the cells on the highest priority frequency meeting the criteria.

If the evaluation of neighbor cells connected to 5GC is ongoing then, at operation 618, the method includes evaluating the cell that already meet the reselection criteria and waiting for ongoing evaluation to complete. At operation 620, the method includes reselecting to the cell ranked as the best cell among all the cells connected to 5GC.

At operation 622, the method includes determining whether the at least one neighbor cell meeting the reselection criteria is connected to the 5GC. If the at least one neighbor cell meeting the reselection criteria is connected to the 5GC then, at operation 624, the method includes reselecting to the cell ranked as the best cell among all the cells connected to the 5GC.

If the at least one neighbor cell meeting the reselection criteria is not connected to the 5GC then, at operation 626, the method includes starting the timer 140. At operation 628, the method includes determining whether the evaluation of neighbor cells connected to 5GC is ongoing.

If the evaluation of neighbor cells connected to 5GC is not ongoing then, at 630, the method includes reselecting to the cell ranked as the best cell among all the cells on the highest priority frequency meeting the criteria.

If the evaluation of neighbor cells connected to 5GC is ongoing then, at operation 632, the method includes evaluating the cell that already meet the reselection criteria and waiting for ongoing evaluation to complete.

At operation 634, the method includes determining whether any cell connected to 5GC is valid for reselection. If the cell connected to 5GC is valid for reselection then, at operation 636, the method includes stopping the timer 140 then, the method performs the operation 630.

If the cell connected to 5GC is not valid for reselection then, at operation 638, the method includes determining whether the timer 140 exceeds the threshold. If the timer 140 exceeds the threshold then at operation 632, the method includes evaluating the cell that already meet the reselection criteria and waiting for ongoing evaluation to complete.

If the timer 140 does not exceed the threshold then at operation 630, the method includes reselecting to the cell ranked as the best cell among all the cells on the highest priority frequency meeting the criteria.

The embodiments disclosed herein can be implemented using at least one software program running on at least one hardware device and performing network management functions to control the elements.

The various actions, acts, blocks, operations, or the like in the methods 400 to 600 may be performed in the order presented, in a different order or simultaneously. Further, in some embodiments, some of the actions, acts, blocks, operations, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for handling cell selection in a wireless communication system, the method comprising:
   detecting, by a user equipment (UE), a plurality of neighboring cells having a signal strength better than a serving cell;
   acquiring, by the UE, a system information block (SIB) message from each of the detected plurality of neighboring cells;
   determining, by the UE, at least one neighboring cell having a 5th generation core (5GC) connectivity from the detected plurality of neighboring cells based on the acquired SIB messages;
   in a case in which there is no at least one neighboring cell having the 5GC connectivity from the detected plurality of neighboring cells, detecting, by the UE, whether the determining of the at least one neighboring cell having the 5GC connectivity from the detected plurality of neighboring cells is ongoing and has not completed;
   waiting, by the UE, to perform cell selection while it is detected that the determining of the at least one neighboring cell having the 5GC connectivity from the detected plurality of neighboring cells is ongoing and has not completed; and
   based on detection that the determining of the at least one neighboring cell having 5GC connectivity from the detected plurality of the neighboring cells is completed, performing, by the UE, cell selection in which a selection of the at least one neighboring cell having the 5GC connectivity is prioritized over other neighboring cells of the detected plurality of neighboring cells.

2. The method according to claim 1, wherein the detecting, by the UE, of the plurality of neighboring cells having the signal strength better than the serving cell comprises:
   detecting, by the UE, a plurality of signal parameters of the plurality of neighboring cells, the plurality of signal parameters comprising at least one of a reference signal received power (RSRP), reference signal received quality (RSRQ) or a radio condition; and
   detecting, by the UE, the plurality of neighboring cells having the signal strength better than the serving cell based on the detected plurality of signal parameters of the plurality of neighboring cells.

3. The method according to claim 1, wherein the determining, by the UE, of the at least one neighboring cell having the 5GC connectivity from the detected plurality of neighboring cells comprises:
   obtaining, by the UE, information on the detected plurality of neighboring cells from the acquired SIB messages;
   comparing, by the UE, a priority for cell selection of the serving cell with a priority for cell selection of the detected plurality of neighboring cells having a signal strength based on the obtained information; and
   determining, by the UE, the at least one neighboring cell having the 5GC connectivity from the detected plurality of neighboring cells based on the comparison.

4. The method according to claim 3, wherein the obtained information comprises a list of public land mobile networks (PLMNs) in the detected plurality of the neighboring cells having the 5GC connectivity and the priority for a cell selection of the detected plurality of neighboring cells.

5. The method according to claim 1, wherein the performing, by the UE, the cell selection in which the selection of the at least one neighboring cell having the 5GC connectivity is prioritized over other neighboring cells of the detected plurality of neighboring cells comprises:
   determining, by the UE, a priority of each of the detected plurality of the neighboring cells;
   ranking, by the UE, the detected plurality of the neighboring cells based on the priority of each of the detected plurality of the neighboring cells, the signal strength of each of the detected plurality of the neighboring cells and the 5GC connectivity of each of the detected plurality of the neighboring cells; and
   selecting, by the UE, a neighboring cell having a highest rank over other neighboring cells of the detected plurality of neighboring cells.

6. The method according to claim 5, wherein the ranking, by the UE, of the detected plurality of the neighboring cells comprises ranking, by the UE, the detected plurality of neighboring cells after detection that the determining of the at least one neighboring cell having 5GC connectivity from the detected plurality of the neighboring cells is completed.

7. The method according to claim 5,
   wherein the detecting, by the UE, of whether the determining of the at least one neighboring cell having the 5GC connectivity from the detected plurality of the neighboring cells is ongoing and has not completed comprises:
   starting, by the UE, a timer; and
   detecting, by the UE, whether the determining of the at least one neighboring cell having the 5GC connectivity from the detected plurality of the neighboring cells is completed before expiry of the timer, and
   wherein the ranking, by the UE, of the detected plurality of the neighboring cells comprises one of:
   in response to detection that the determining of the at least one neighboring cell having the 5GC connectivity from the detected plurality of the neighboring cells is completed before expiry of the timer, ranking the at least one neighboring cell having the 5GC connectivity, or in response to detection that the determining of the at least one neighboring cell having the 5GC connectivity from the detected plurality of the neighboring cells is not completed before expiry of the timer, ranking the detected plurality of neighboring cells based on a priority frequency associated with each of the detected plurality of neighboring cells.

8. The method according to claim 7, wherein the priority frequency is determined based on the 5GC connectivity of the detected plurality of neighboring cells and a signal strength of the detected plurality of neighboring cells.

9. A user equipment (UE) for handling cell selection in a wireless communication system, the UE comprising:
a memory; and
at least one processor, coupled with the memory, configured to:
detect a plurality of neighboring cells having a signal strength better than a serving cell,
acquire a system information block (SIB) message from each of the detected plurality of neighboring cells,
determine at least one neighboring cell having a 5th generation core (5GC) connectivity from the detected plurality of neighboring cells based on the acquired SIB messages,
in a case in which there is no at least one neighboring cell having the 5GC connectivity from the detected plurality of neighboring cells, detect whether the determining of the at least one neighboring cell having the 5GC connectivity from the detected plurality of neighboring cells is ongoing and has not completed,
wait to perform cell selection while it is detected that the determining of the at least one neighboring cell having the 5GC connectivity from the detected plurality of neighboring cells is ongoing and has not completed, and
based on detection that the determining of the at least one neighboring cell having 5GC connectivity from the detected plurality of the neighboring cells is completed, perform cell selection in which a selection of the at least one neighboring cell having the 5GC connectivity is prioritized over other neighboring cells of the detected plurality of neighboring cells.

10. The UE according to claim 9, wherein the at least one processor, when detecting the plurality of neighboring cells having the signal strength better than the serving cell, is further configured to:
detect a plurality of signal parameters of a plurality of neighboring cells, the plurality of signal parameters comprising at least one of a reference signal received power (RSRP), reference signal received quality (RSRQ) or a radio condition, and
detect the plurality of neighboring cells having the signal strength better than the serving cell based on the detected plurality of signal parameters of the plurality of neighboring cells.

11. The UE according to claim 9, wherein the at least one processor, when determining the at least one neighboring cell having the 5GC connectivity from the detected plurality of neighboring cells, is further configured to:
obtain information on the detected plurality of neighboring cells from the acquired SIB messages,
compare a priority for cell selection of the serving cell with a priority for cell selection of the detected plurality of neighboring cells having a signal strength based on the obtained information, and
determine the at least one neighboring cell having the 5GC connectivity from the detected plurality of neighboring cells based on the comparison.

12. The UE according to claim 11, wherein the obtained information comprises a list of public land mobile networks (PLMNs) in the detected plurality of the neighboring cells having the 5GC connectivity and the priority for a cell selection of the detected plurality of neighboring cells.

13. The UE according to claim 9, wherein the at least one processor, when performing the cell selection in which the selection of the at least one neighboring cell having the 5GC connectivity is prioritized over other neighboring cells of the detected plurality of neighboring cells, is further configured to:
determine a priority of each of the detected plurality of the neighboring cells,
rank the detected plurality of the neighboring cells based on the priority of each of the detected plurality of the neighboring cells, the signal strength of each of the detected plurality of the neighboring cells and the 5GC connectivity of each of the detected plurality of the neighboring cells, and
select a neighboring cell having a highest rank over other neighboring cells of the detected plurality of neighboring cells.

14. The UE according to claim 13, wherein the at least one processor, when ranking the detected plurality of the neighboring cells, is further configured to rank the detected plurality of neighboring cells after detection that the determining of the at least one neighboring cell having 5GC connectivity from the detected plurality of the neighboring cells is completed.

15. The UE according to claim 13,
wherein the at least one processor, when detecting whether the determining of the at least one neighboring cell having the 5GC connectivity from the detected plurality of the neighboring cells is ongoing and has not completed, is further configured to:
start a timer,
detect whether the determining of the at least one neighboring cell having the 5GC connectivity from the detected plurality of the neighboring cells is completed before expiry of the timer, and
wherein the at least one processor, when ranking the detected plurality of the neighboring cells, is further configured to one of:
in response to detection that the determining of the at least one neighboring cell having the 5GC connectivity from the detected plurality of the neighboring cells is completed before expiry of the timer, ranking the at least one neighboring cell having the 5GC connectivity, or
in response to detection that the determining of the at least one neighboring cell having the 5GC connectivity from the detected plurality of the neighboring cells is not completed before expiry of the timer, ranking the detected plurality of neighboring cells based on a priority frequency associated with each of the detected plurality of neighboring cells.

16. The UE according to claim 15, wherein the priority frequency is determined based on the 5GC connectivity of the detected plurality of neighboring cells and a signal strength of the detected plurality of neighboring cells.

\* \* \* \* \*